United States Patent
Hynes et al.

(10) Patent No.: US 11,614,845 B2
(45) Date of Patent: *Mar. 28, 2023

(54) USER INTERFACE FOR APPLICATION INTERFACE MANIPULATION

(71) Applicant: Apple Inc., Cupertino, CA (US)

(72) Inventors: Christopher J. Hynes, Mountain View, CA (US); John Louch, Boulder, CO (US); Bas Ording, San Francisco, CA (US); Timothy Wayne Bumgarner, Sharpsburg, MD (US); Eric Steven Peyton, Naperville, IL (US)

(73) Assignee: Apple Inc., Cupertino, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 15/783,267

(22) Filed: Oct. 13, 2017

(65) Prior Publication Data

US 2018/0039381 A1    Feb. 8, 2018

Related U.S. Application Data

(63) Continuation of application No. 11/760,696, filed on Jun. 8, 2007, now Pat. No. 9,791,994.

(51) Int. Cl.
*G06F 3/0481* (2022.01)

(52) U.S. Cl.
CPC .. *G06F 3/0481* (2013.01); *G06F 2203/04803* (2013.01)

(58) Field of Classification Search
CPC .................. G06F 3/0481; G06F 2203/04803
USPC .......................................................... 715/764
See application file for complete search history.

(56) References Cited

U.S. PATENT DOCUMENTS

| | | |
|---|---|---|
| 5,461,710 A | 10/1995 | Bloomfield et al. |
| 5,483,261 A | 1/1996 | Yasutake |
| 5,488,204 A | 1/1996 | Mead et al. |
| 5,565,657 A | 10/1996 | Merz |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,201,539 B1 | 3/2001 | Miller et al. |
| 6,310,610 B1 | 10/2001 | Beaton et al. |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

3D Desktop Project by Sun MicroSystems: A Revolutionary Evolution of Today's Desktop, located at http:///www.lg3d.dev.java.net.

(Continued)

*Primary Examiner* — Tadesse Hailu
*Assistant Examiner* — Darrin Hope
(74) *Attorney, Agent, or Firm* — Kubota & Basol LLP (57) ABSTRACT

Selection of visualization objects, such as applications windows, is performed by determining a position of a system object. A graphical representation of a system object can be positioned over a display area of an application interface. The application interface is preeminently displayed in response to a graphical representation of system object being positioned over a corresponding display area of the application interface.

27 Claims, 7 Drawing Sheets

(56) References Cited

U.S. PATENT DOCUMENTS

| | | | |
|---|---|---|---|
| 6,323,846 | B1 | 11/2001 | Westerman et al. |
| 6,690,387 | B2 | 2/2004 | Zimmerman et al. |
| 6,765,567 | B1 | 7/2004 | Roberson et al. |
| 7,015,894 | B2 | 3/2006 | Morohoshi |
| 7,043,701 | B2 | 5/2006 | Gordon |
| 7,119,819 | B1 | 10/2006 | Robertson et al. |
| 7,184,064 | B2 | 2/2007 | Zimmerman et al. |
| 7,663,607 | B2 | 2/2010 | Hotelling et al. |
| 7,739,604 | B1 | 6/2010 | Lyons et al. |
| 7,987,432 | B1 | 7/2011 | Grechishkin et al. |
| 8,479,122 | B2 | 7/2013 | Hotelling et al. |
| 2002/0140746 | A1 | 10/2002 | Gargi |
| 2002/0167546 | A1 | 11/2002 | Kimbell et al. |
| 2003/0076362 | A1 | 4/2003 | Terada |
| 2003/0117440 | A1 | 6/2003 | Hellyar et al. |
| 2003/0179234 | A1 | 9/2003 | Nelson et al. |
| 2003/0179237 | A1 | 9/2003 | Nelson et al. |
| 2004/0261037 | A1 | 12/2004 | Ording et al. |
| 2004/0261038 | A1* | 12/2004 | Ording .............. G06F 3/0481 715/792 |
| 2004/0268393 | A1* | 12/2004 | Hunleth .............. G06F 3/0482 725/44 |
| 2005/0010876 | A1 | 1/2005 | Robertson et al. |
| 2005/0066292 | A1 | 3/2005 | Harrington |
| 2005/0081155 | A1* | 4/2005 | Martin .............. G11B 27/34 715/719 |
| 2005/0091254 | A1 | 4/2005 | Stabb et al. |
| 2005/0091612 | A1 | 4/2005 | Stabb et al. |
| 2005/0240880 | A1 | 10/2005 | Banks et al. |
| 2005/0283742 | A1 | 12/2005 | Gusmorino et al. |
| 2006/0026521 | A1 | 2/2006 | Hotelling et al. |
| 2006/0075359 | A1 | 4/2006 | Bauchot et al. |
| 2006/0161688 | A1 | 7/2006 | Vann Dok et al. |
| 2006/0161861 | A1 | 7/2006 | Holecek et al. |
| 2006/0197753 | A1 | 9/2006 | Hotelling |
| 2007/0070066 | A1 | 3/2007 | Bakhash |
| 2007/0186177 | A1 | 8/2007 | Both et al. |
| 2008/0059893 | A1 | 3/2008 | Byrne et al. |
| 2008/0307336 | A1 | 12/2008 | Hynes et al. |

OTHER PUBLICATIONS

3DNA Desktop, located at http:www.3dna.net/products/desktop.html, last visited Nov. 9, 2006.

Agarawala, A. et al. (2006). "Keepin' it Real: Pushing the Desktop Metaphor with Physics, Piles and the Pen," located at http://bumptop.com/BumpTop, Montreal, Quebec, Canada, last visited May 14, 2008.

BumpTop 3D Desktop Prototype—www.bumptop.com (2008), located at http:///www.youtube.com/watch?v=M0OdskdEPnQ., last visited May 14, 2008.

Final Rejection dated Jul. 28, 2010, for U.S. Appl. No. 11/760,696, filed Jun. 8, 2007, 19 pages.

Final Rejection dated Mar. 27, 2014, for U.S. Appl. No. 11/760,696, filed Jun. 8, 2007, 20 pages.

Final Rejection dated Jan. 29, 2016, for U.S. Appl. No. 11/760,696, filed Jun. 8, 2007, 20 pages.

Java Solaris Communities Partners My Sun Sun, located at http://www.sun.com/software/looking_glass/details.xml, last visited Nov. 9, 2006.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Metisse—Screenshots, located at http://insitu.lrl.fr/~chapuis/metisse/screenshots, last visited Nov. 9, 2006.

Non-Final Rejection dated Feb. 5, 2010, for U.S. Appl. No. 11/760,696, filed Jun. 8, 2007, 20 pages.

Non-Final Rejection dated Aug. 30, 2013, for U.S. Appl. No. 11/760,696, filed Jun. 8, 2007, 14 pages.

Non-Final Rejection dated Apr. 14, 2015, for U.S. Appl. No. 11/760,696, filed Jun. 8, 2007, 20 pages.

Notice of Allowance dated Jun. 19, 2017, for U.S. Appl. No. 11/760,696, filed Jun. 8, 2007, eight pages.

Rotate Widow, Java Technology Powers Vodafone Mobile Games Worldwide, (1994-2006). Sun Microsystems, Inc. located at http://www.sun.com/jsp_utils/ScreenShotPopup.jsp?title=R...ss/&im=md_1.jpg&alt=Generic%20Screen%20Shot%20Alt%20Text, last visited Nov. 9, 2006.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Spatial Research, located at http://www.spatialresearch.com/spaces, last visited Nov. 9, 2006. (three entries).

Stanford Panorama, (1994-2006). Sun Microsystems, Inc. located at http://www.sun.com/jsp_utils/ScreenShotPopup.jsp?title=St.../&im=pan_2.jpg&ait=Generic%20Screen%20Shot%20Alt%20Text11/9/2006, last visited Nov. 9, 2006.

Switch Desktops, (1994-2006). Sun Microsystems, Inc. located at http://www.sun.com/jsp_utils/ScreenShotPopup.jsp?title=Sw.../&im=pan-r_3.jpg&alt=Generic%20Screen%20Shot%20Alt%20Text11/9/2006, last visited Nov. 9, 2006.

The TaskGallery, located at http://research.microsoft.com/ui/TaskGaller, last visited on Nov. 9, 2006.

Three Dimensional Desktop—Google Search, located at http://www.google.com/search?sourceid=navclient&ie=U...LJ:2006-42,GGLJ:en&q=%22three+dimensional+desktop%22, last visited Nov. 9, 2006.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

USER INTERFACE FOR APPLICATION INTERFACE MANIPULATION

CROSS-REFERENCE TO RELATED APPLICATION

This application is a continuation of U.S. patent application Ser. No. 11/760,696, filed Jun. 8, 2007 and published on Dec. 11, 2008 as U.S. Patent Publication No. US 2008-0307336 which is incorporated herein by reference in their entirety for all purposes.

BACKGROUND

A graphical user interface allows a large number of graphical objects or items to be displayed on a display screen at the same time. Leading personal computer operating systems, such as the Apple Mac OS®, provide user interfaces in which a number of graphical representations of system objects can be displayed. Example system objects include system functions, alerts, windows, peripherals, files, and applications. Taskbars, menus, virtual buttons, a mouse, a keyboard, and other user interface elements provide mechanisms for accessing and/or activating the system objects corresponding to the displayed representations.

The graphical objects and access to the corresponding system objects and related functions, however, can be presented in a manner that facilitates an intuitive user experience. The use of metaphors that represent concrete, familiar ideas facilitate such an intuitive user experience. For example, the metaphor of a document or photo can be used to identify an electronic file; the metaphor of file folders can be used for storing documents, etc.

Often a graphical object, e.g., an application interface, may be selected from the objects or item being displayed on the display screen. For example, a user may select an application interface associated with a word processing application to open or edit documents. Presently, in many graphical user interfaces, a two-step process is performed that includes: selecting a particular application interface, and then either opening a file from a menu or dragging a graphical representation of a file onto a display area of the application interface.

SUMMARY

Disclosed herein is a user interface for window manipulation. In an implementation, a computer-implemented method displays a plurality of application interfaces in a graphical user interface environment, each displayed application interface defining a corresponding display area. The method determines if a graphical representation of a system object is positioned within a corresponding display area of an application interface, and preeminently displays the application interface in response to the graphical representation of the system object being positioned within the corresponding display area of the application interface.

In another implementation, a computer-readable medium stores instructions that are executable by a processing device to generate a graphical user interface on a display device. The instructions facilitate the processes of displaying a plurality of application interfaces in a graphical user interface environment, determining if a graphical representation of a system object is positioned within a corresponding display area of an application interface, and preeminently displaying the application interface in response to the graphical representation of the system object being positioned within the corresponding display area of the application interface.

In another implementation, a computer-implemented method displays a plurality of application interfaces in a graphical user interface environment, where each displayed application interface defines a corresponding display area. The method determines if a graphical representation of a system object is positioned within a predetermined area of the graphical user interface environment, and displays the application interfaces in a predetermined orientation within the graphical user interface environment in response to the graphical representation of the system object being positioned within the predetermined area of the graphical user interface environment.

DETAILED DESCRIPTION

Figure 1:
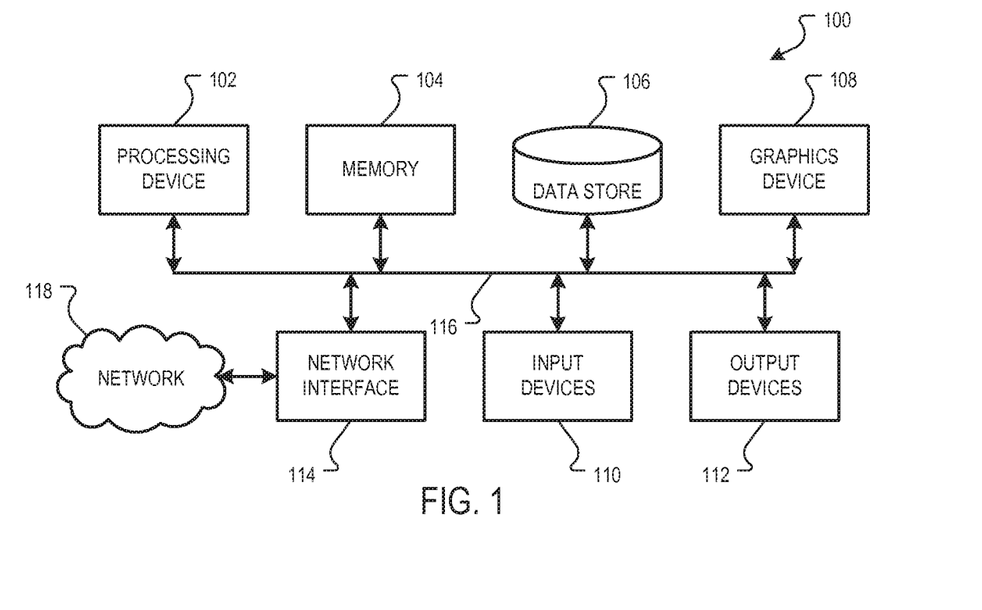
FIG. 1 is a block diagram of an example system that can be utilized to implement the systems and methods described herein.

FIG. 1 is a block diagram of an example system 100 that can be utilized to implement the systems and methods described herein. The system 100 can, for example, be implemented in a computer device, such as any one of the personal computer devices available from Apple Inc., or other electronic devices. Other example implementations can also include video processing devices, multimedia processing devices, portable computing devices, portable electronic devices, gaming consoles, personal digital assistants, mobile telephones, set top boxes, etc.

The example system 100 includes a processing device 102, a first data store 104, a second data store 106, a graphics device 108, input devices 110, output devices 112, and a network device 114. A bus system 116, such as a data bus and a motherboard, can be used to establish and control data communication between the components 102, 104, 106, 108, 110, 112 and 114. Other example system architectures, however, can also be used.

The processing device 102 can, for example, include one or more microprocessors. The first data store 104 can, for example, include a random access memory storage device, such as a dynamic random access memory, or other types of computer-readable medium memory devices. The second data store 106 can, for example, include one or more hard drives, a flash memory, and/or a read only memory, or other types of computer-readable medium memory devices.

The graphics device 108 can, for example, include a video card, a graphics accelerator card, or a display adapter, and is configured to generate and output images to a display device. In one implementation, the graphics device 108 can be realized in a dedicated hardware card connected to the bus system 116. In another implementation, the graphics device 108 can be realized in a graphics controller integrated into a chipset of the bus system 116. Other implementations can also be used.

Example input devices 110 can include a keyboard, a mouse, a stylus, a video camera, a multi-touch surface, etc., and example output devices 112 can include a display device, an audio device, etc.

The network interface 114 can, for example, include a wired or wireless network device operable to communicate data to and from a network 118. The network 118 can include one or more local area networks (LANs) or a wide area network (WAN), such as the Internet.

In an implementation, the system 100 includes instructions defining an operating system stored in the first data store 104 and/or the second data store 106. Example operating systems can include the MAC OS® X series operating system, the WINDOWS® based operating system, or other operating systems. Upon execution of the operating system instructions, access to various system objects is enabled. Example system objects include data files, applications, functions, windows, etc. To facilitate an intuitive user experience, the system 100 includes a graphical user interface that provides the user access to the various system objects and conveys information about the system 100 to the user in an intuitive manner.

Figure 2:
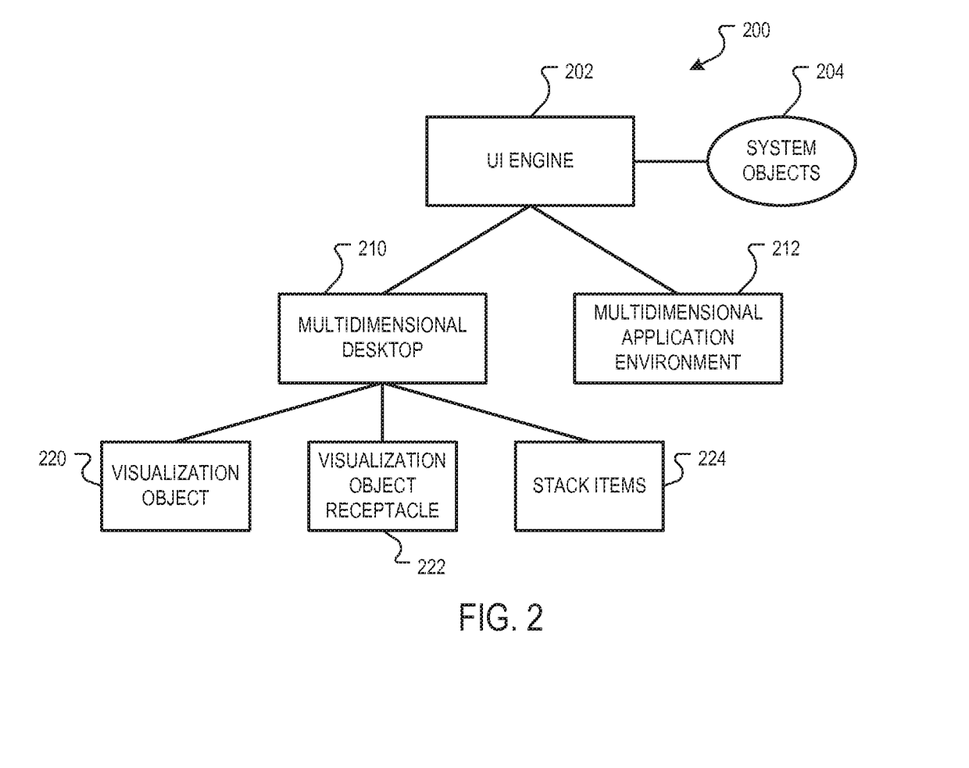
FIG. 2 is a block diagram of an example user interface architecture.

FIG. 2 is a block diagram of an example user interface architecture 200. The user interface architecture 200 includes a user interface (UI) engine 202 that provides the user access to the various system objects 204 and conveys information about the system 100 to the user.

Upon execution, the UI engine 202 can cause the graphics device 108 to generate a graphical user interface on an output device 112, such as a display device. In one implementation, the graphical user interface can include a multidimensional desktop 210 and a multidimensional application environment 212. In an implementation, the multidimensional desktop 210 and the multidimensional application environment 212 include x-, y-and z-axis aspects, e.g., a height, width and depth aspect. The x-, y-and z-axis aspects may define a three-dimensional environment, e.g., a "3D" or "2.5D" environment that includes a z-axis, e.g., depth, aspect.

In an implementation, the multidimensional desktop 210 can include visualization objects 220, a visualization object receptacle 222, and stack items 224. In some implementations, the visualization objects 220, the visualization object receptacle 222 and the stack items 224 can be presented in a pseudo-three dimensional (i.e., "2.5D") or a three-dimensional environment as graphical objects having a depth aspect. An example implementation of a visualization object receptacle 22 is the "Dock" user interface in the MAC OS® X Leopard operating system. Other implementations can also be used.

A visualization object 220 can, for example, be a visual representation of a system object. In some implementations, the visualization objects 220 are icons. Other visualization objects can also be used, e.g., alert notification windows, menu command bars, windows, or other visual representations of system objects.

In an implementation, the multidimensional application environment 212 can include an application environment distributed along a depth aspect. For example, a content frame, e.g., an application window, can be presented on a first surface, and control elements, e.g., toolbar commands, can be presented on a second surface.

Figure 3:
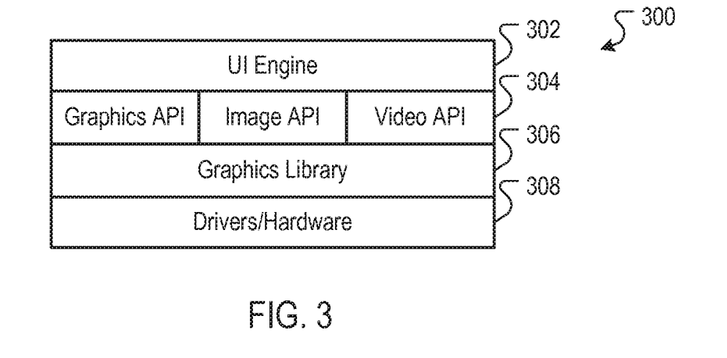
FIG. 3 is a block diagram of an example system layer structure that can be utilized to implement the systems and methods described herein.

FIG. 3 is block diagram of example system layers 300 that can be utilized to implement the systems and methods described herein. Other system layer implementations, however, can also be used.

In an implementation, a user interface engine, such as the UI engine 202, or another UI engine capable of generating a multidimensional user interface environment, operates at an application level 302 and implements graphical functions and features available through an application program interface (API) layer 304. Example graphical functions and features include graphical processing, supported by a graphics API, image processing, support by an imaging API, and video processing, supported by a video API.

The API layer 304, in turn, interfaces with a graphics library layer 306. The graphics library layer 304 can, for example, be implemented as a software interface to graphics hardware, such as an implementation of the OpenGL specification. A driver/hardware layer 308 includes drivers and associated graphics hardware, such as a graphics card and associated drivers.

Figure 4:
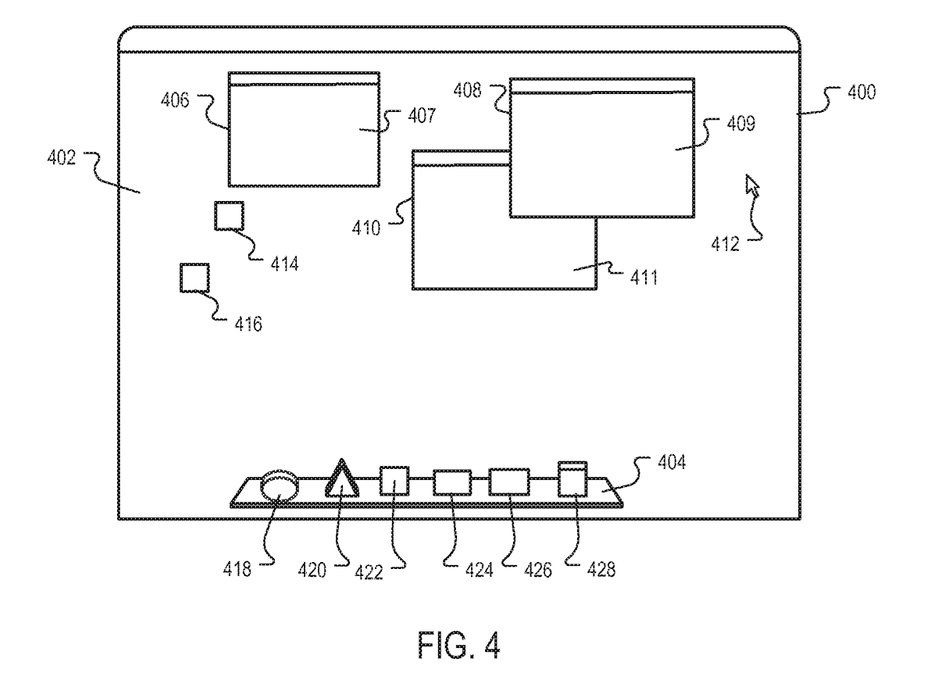
FIG. 4 is an example graphical user interface environment.

FIG. 4 is an example graphical user interface environment 400 that can be implemented as the multidimensional desktop 210. In the example implementation, the graphical user interface environment 400 includes a desktop region 402 and a visualization object receptacle 404 that is disposed on a floor of the graphical user interface environment 400. The visualization object receptacle 404 can also be disposed, e.g., on a side or top, of the graphical user interface environment 400. The visualization object receptacle 404 can include a plurality of icons 418, 420, 422, 424, 426 and 428. The icons 418, 420, 422, 424, 426 and 428 can, for example, include graphical representations corresponding to one or more system objects, such as applications, documents, and functions.

The desktop region 402 can include one or more application interfaces 406, 408 and 410 having display areas 407, 409 and 411, respectively. Within the display areas 407, 409 and 411, system objects such as application software can present an application interface (e.g., a word processor, a picture editor, etc.). A pointer 412 can be provided to graphically represent movements received from input devices 112 (e.g., keyboard or mouse movements). Icons 414 and 416 can be placed on the desktop that, for example, include graphical representations corresponding to one or more system objects, such as applications, documents, and functions.

Figure 5A:
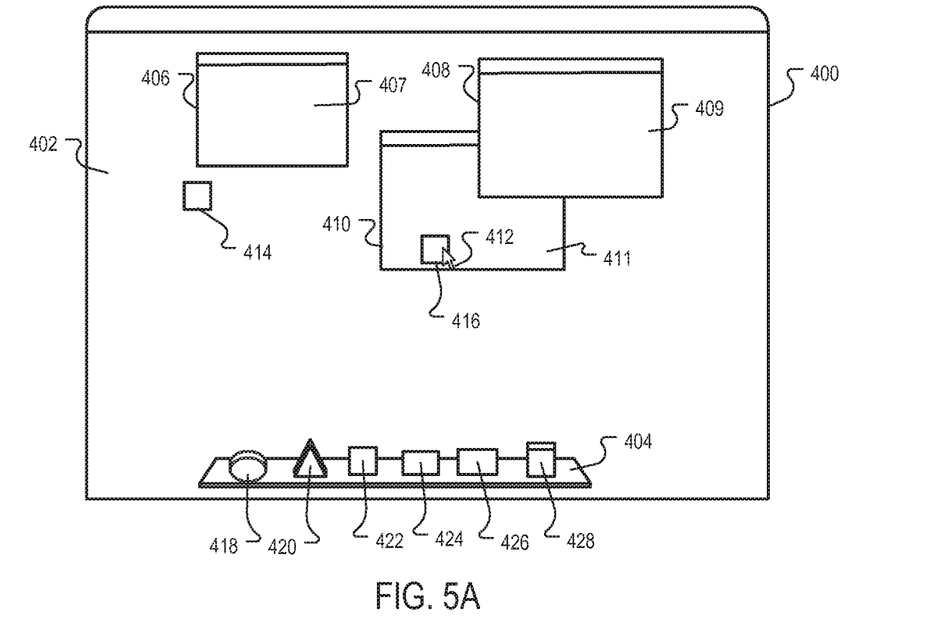
FIGS. 5A-5B illustrate an example of application interface manipulation.
Figure 5B:
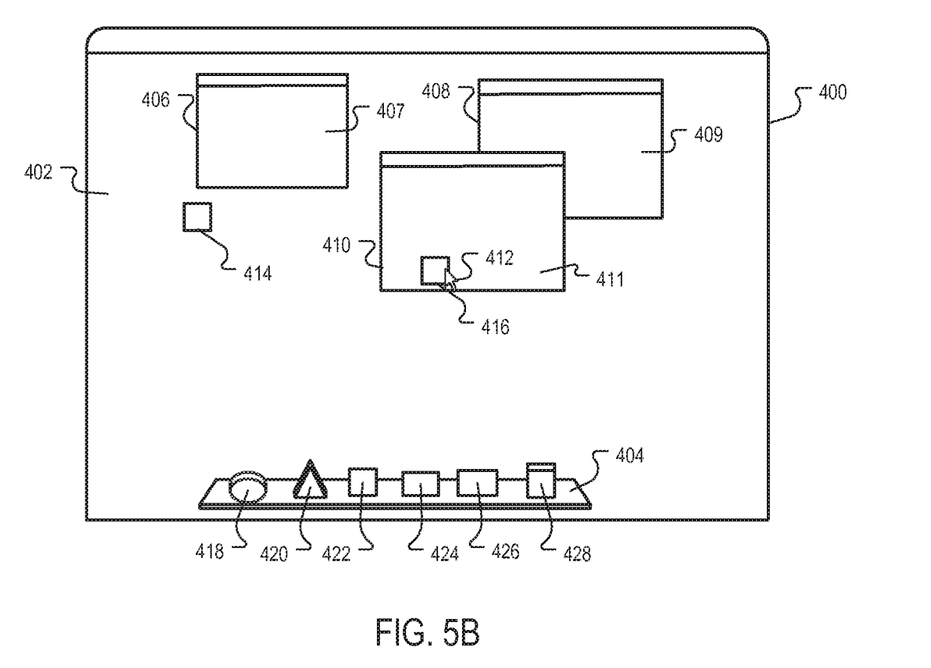

FIGS. 5A-5B illustrate an example of application interface manipulation. As shown in FIG. 5A, the application interface 410 is behind the application interface 408 in the graphical user interface environment 400. Thus, a portion of application interface 410 is obscured by the application interface 408. In an implementation, upon processing of an input to select one of the icons (e.g., icon 416) using the pointer 412, a user can move the icon 416 within the display area 411 of the application interface 410.

In some implementations, as shown in FIG. 5B, after a predetermined period of time has elapsed after the icon 416 first hovers over the display area 411, the application interface 410 is displayed preeminently in the graphical user interface environment 400.

In some implementations, the system object represented by the icon 414 or 416 is loaded and displayed within the display area 407, 409 or 411 of the application interface 406, 408 or 410. In some implementations, the application executing in the application interface 406, 408 or 410 is associated with the system object represented by the icon 414 or 416 through, for example, a file association, header information, etc.

In some implementations, the application interface 406, 408 or 410 can flash or change color prior to being displayed preeminently in the graphical user interface environment 400 to alert a user that the application interface 406, 408 or 410 will be displayed in the foreground of the graphical user interface environment 400.

In some implementations, the application interface 406, 408 or 410 is preeminently displayed only if the icon 414 or 416 is placed over a predetermined portion of the display area 407, 409 or 411.

Figure 6A:
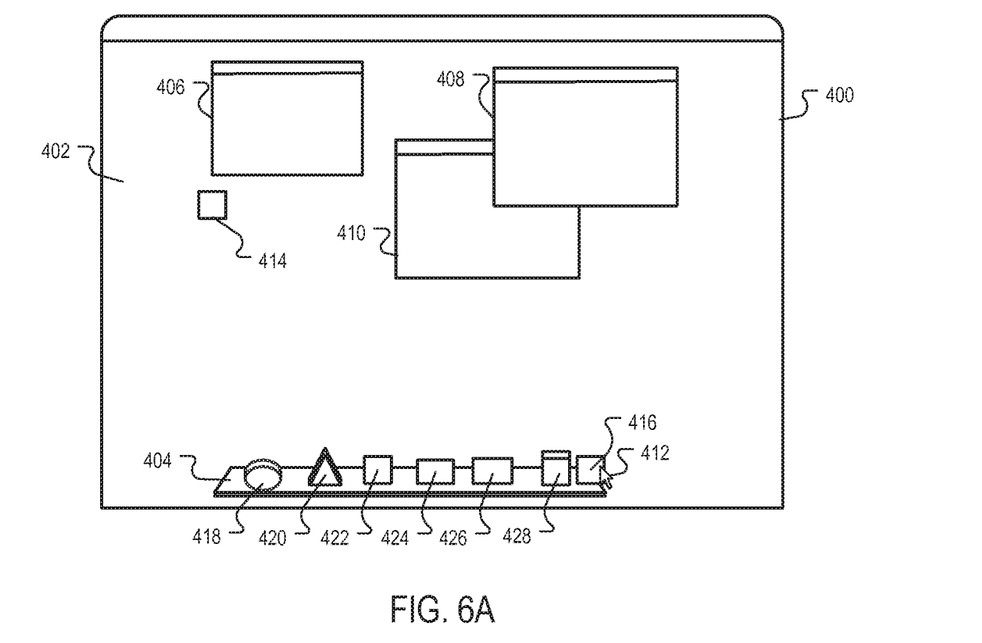
FIGS. 6A-6C illustrate another example of application interface manipulation.
Figure 6B:
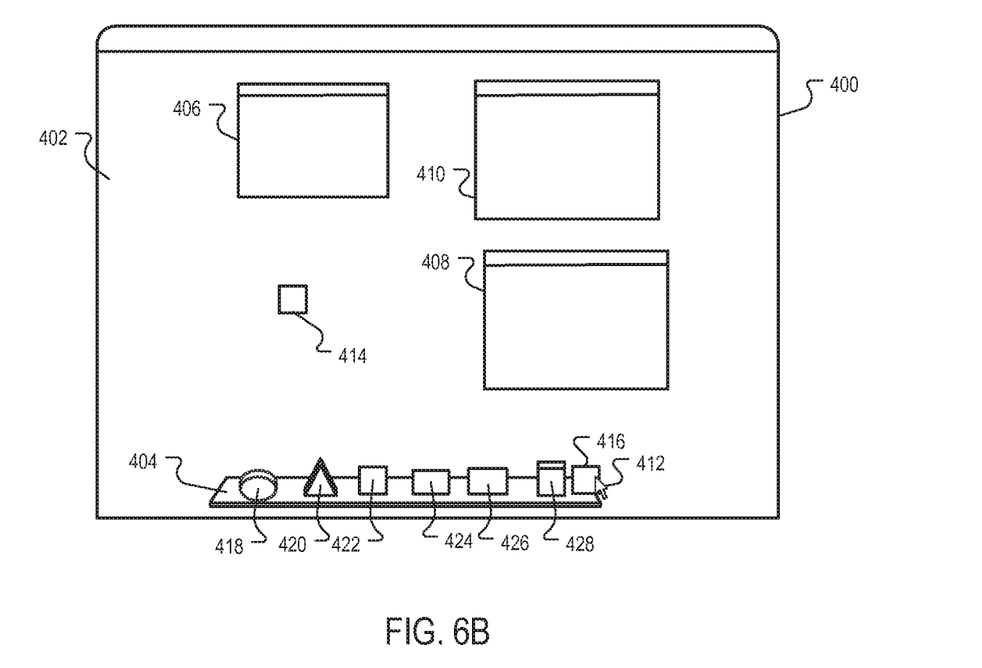
Figure 6C:
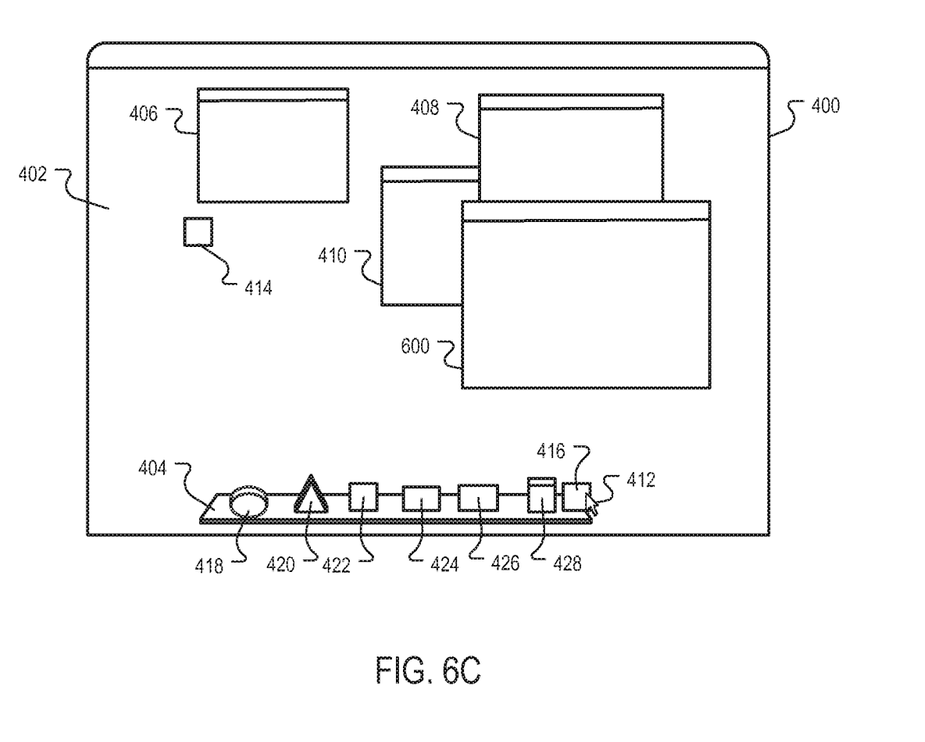

FIGS. 6A-6C illustrates another example of application interface manipulation. As shown in FIG. 6A, upon processing of an input to select one of the icons (e.g., icon 416) using the pointer 412, a user can move the icon 416 within the visualization object receptacle 404. As shown in FIG. 6B, after a predetermined period of time elapses, all of application interfaces 406, 408 and 410 are visibly displayed in the graphical user interface environment 400. In some implementations, the application interfaces 406, 408 and 410 are scaled based on a number of application interfaces being displayed and/or a size of the graphical user interface environment 400. In some implementations, the application interface having the focus of the graphical user interface environment 400 can be made larger than the others of the application interfaces 406, 408 and 410.

In an implementation shown in FIG. 6C, upon processing of a selection input to select one of the icons (e.g., icon 416) using the pointer 412, a user can move the icon 416 to a position hovering over the visualization object receptacle 404. If the system 100 determines that an application associated with the system object represented by the icon 416 is not running in one of the application interfaces 406, 408 or 410, then the system 110 can launch a new application interface 600 displaying an interface of the application associated with the system object represented by the icon 416. The application interface 600 would be preeminently displayed in the graphical user interface environment 400. In some implementations, the system object represented by the icon 416 can be loaded into the new application interface 600.

Figure 7:
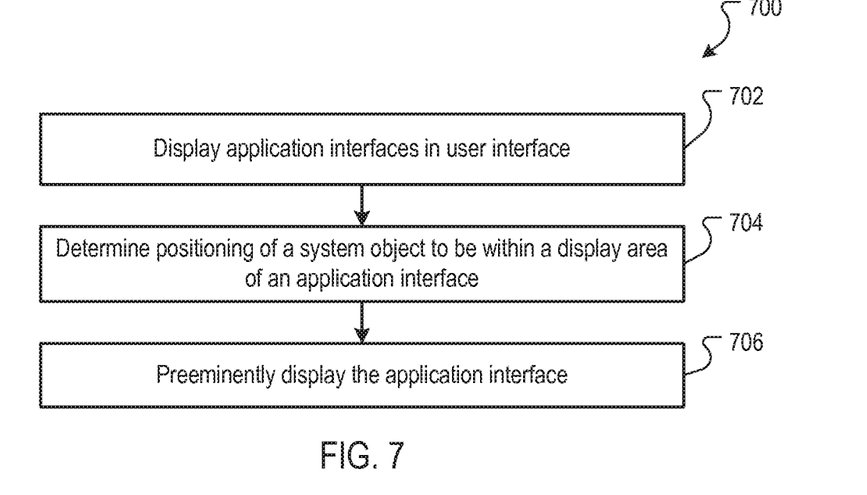
FIG. 7 is a flow diagram of an example process for window manipulation.

FIG. 7 is a flow diagram of an example process 700 for window manipulation. The process 700 can, for example, be implemented in a processing device, such as the system 100 of FIG. 1, implementing user interface software and/or hardware, such as the example implementations described with respect to FIGS. 2 and 3.

Stage 702 displays application interfaces in a graphical user interface. For example, the system 100 of FIG. 1, implementing user interface software and/or hardware described in FIGS. 1, 2 and/or 3, can display application interfaces 406, 408 and 410 within the graphical user interface environment 400.

Stage 704 determines if the positioning of a system object is within a display area of an application interface. For example, the system 100 of FIG. 1, implementing user interface software and/or hardware described in FIGS. 1, 2 and/or 3, can determine if one of icons 414 or 416 is within one of the display areas 407, 409 or 411.

Stage 706 preeminently displays an application interface. For example, the system 100 of FIG. 1, implementing user interface software and/or hardware described in FIGS. 1, 2 and/or 3, can display one of the application interfaces 406, 408 or 410 wherein the icon 416 is positioned as shown in FIG. 5B.

Figure 8:
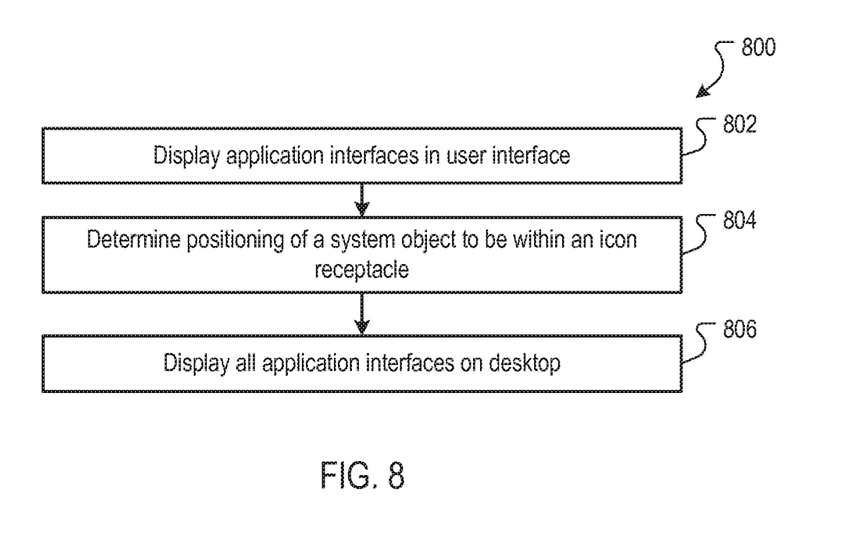
FIG. 8 is a flow diagram of another example process for window manipulation.

FIG. 8 is a flow diagram of another example process 800 for manipulating windows in a graphical user interface environment. The process 800 can, for example, be implemented in a processing device, such as the system 100 of FIG. 1, implementing user interface software and/or hardware, such as the example implementations described with respect to FIGS. 2 and 3.

Stage 802 displays application interfaces in a graphical user interface. For example, the system 100 of FIG. 1, implementing user interface software and/or hardware described in FIGS. 1, 2 and/or 3, can display application interfaces 406, 408 and 410 within the graphical user interface environment 400.

Stage 804 determines if the positioning of a system object is within a visualization object receptacle. For example, the system 100 of FIG. 1, implementing user interface software and/or hardware described in FIGS. 1, 2 and/or 3, can determine if one of icons 414 or 416 is within the visualization object receptacle 404 of the graphical user interface environment 400.

Stage 806 displays all currently running application interfaces. For example, the system 100 of FIG. 1, implementing user interface software and/or hardware described in FIGS. 1, 2 and/or 3, can display the application interfaces 406, 408 or 410 as shown in FIG. 6B.

Figure 9:
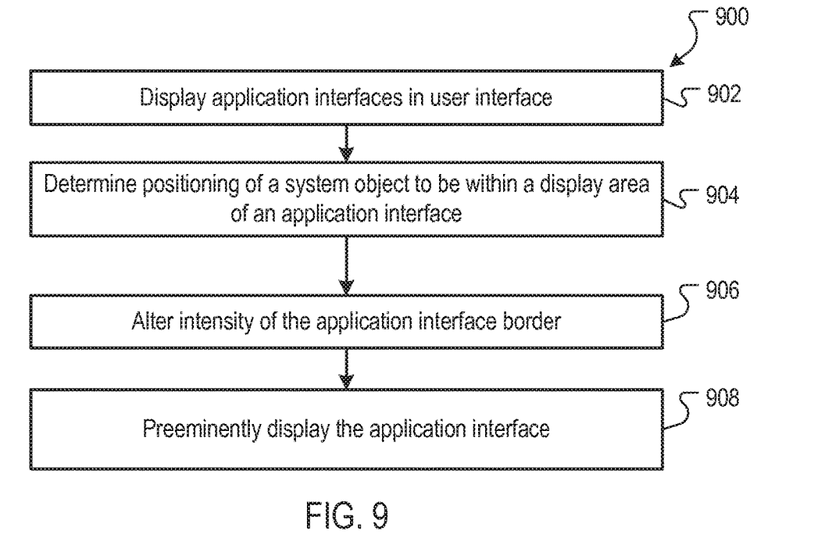
FIG. 9 is a flow diagram of another example process for window manipulation.

FIG. 9 is a flow diagram of another example process 900 for window manipulation. The process 900 can, for example, be implemented in a processing device, such as the system 100 of FIG. 1, implementing user interface software and/or hardware, such as the example implementations described with respect to FIGS. 2 and 3.

Stage 902 displays application interfaces in a graphical user interface. For example, the system 100 of FIG. 1, implementing user interface software and/or hardware described in FIGS. 1, 2 and/or 3, can display application interfaces 406, 408 and 410 within the graphical user interface environment 400.

Stage 904 determines if the positioning of a system object is within a display area of an application interface. For example, the system 100 of FIG. 1, implementing user interface software and/or hardware described in FIGS. 1, 2 and/or 3, can determine if one of icons 414 or 416 is within one of the display areas 407, 409 or 411.

Stage 906 alters the intensity of an application interface border. For example, the system 100 of FIG. 1, implementing user interface software and/or hardware described in FIGS. 1, 2 and/or 3, can display one of the application interfaces 406, 408 or 410 such that the border of the application interface flashes a predetermined number of times or changes color to alert a user that the application interface will be moved to a preeminent position in the graphical user interface environment 400.

Stage 908 preeminently displays the application interface. For example, the system 100 of FIG. 1, implementing user interface software and/or hardware described in FIGS. 1, 2 and/or 3, can display one of the application interfaces 406, 408 or 410 wherein the icon 416 is positioned as shown in FIG. 5B.

Figure 10:
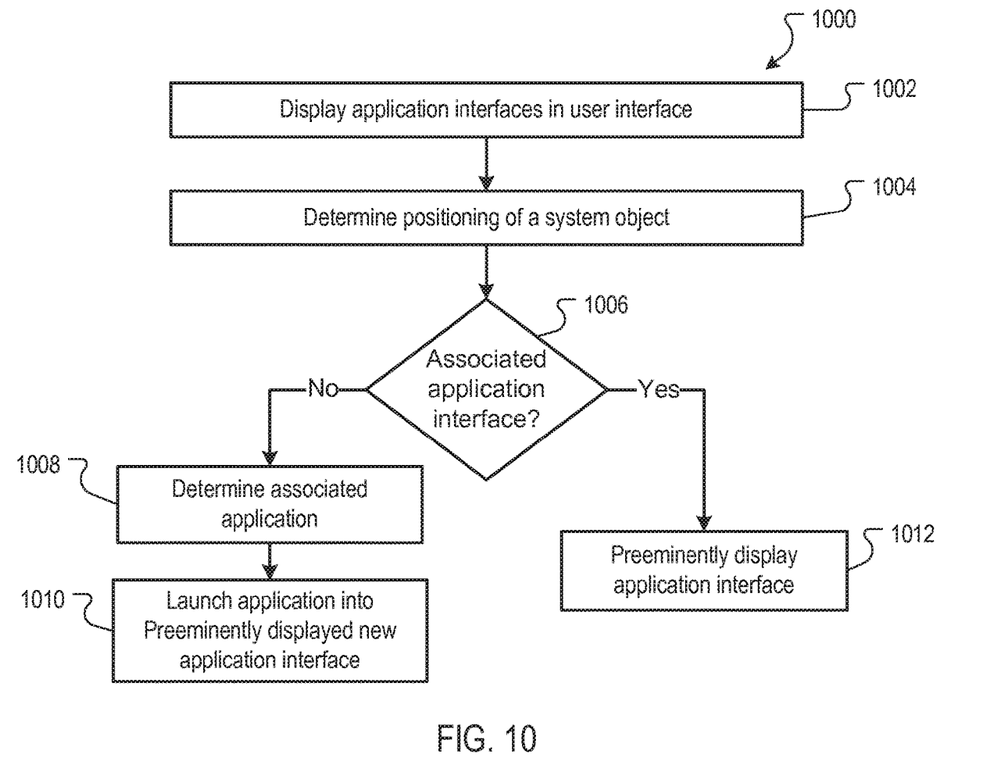
FIG. 10 is a flow diagram of another example process for window manipulation.

FIG. 10 is a flow diagram of another example process 1000 for manipulating windows in a graphical user interface environment. The process 1000 can, for example, be implemented in a processing device, such as the system 100 of FIG. 1, implementing user interface software and/or hardware, such as the example implementations described with respect to FIGS. 2 and 3.

Stage 1002 displays application interfaces in a graphical user interface. For example, the system 100 of FIG. 1, implementing user interface software and/or hardware described in FIGS. 1, 2 and/or 3, can display application interfaces 406, 408 and 410 within the graphical user interface environment 400.

Stage 1004 determines if the positioning of a system object is within a visualization object receptacle. For example, the system 100 of FIG. 1, implementing user interface software and/or hardware described in FIGS. 1, 2 and/or 3, can determine if one of icons 414 or 416 is within the visualization object receptacle 404 of the graphical user interface environment 400.

Stage 1006 determines if an application interface is displaying an application associated with the system object. For example, the system 100 of FIG. 1, implementing user interface software and/or hardware described in FIGS. 1, 2 and/or 3, can determine if an application running one of the application interfaces 406, 408 or 410 is associated with the system object represented by the icon 416.

If, at stage 1006, it is determined that no application interface is running an application that is associated with the system object, then at stage 1008, and associated application for the system object is determined. For example, the system 100 of FIG. 1, implementing user interface software and/or hardware described in FIGS. 1, 2 and/or 3, can determine an associated application through, e.g., a file association or database entry related to the system object represented by the icon 416. At stage 1010 a new application interface is preeminently displayed. For example, the system 100 of FIG. 1, implementing user interface software and/or hardware described in FIGS. 1, 2 and/or 3, can launch the associated application into a new application interface 600, such as shown in FIG. 6C.

If at stage 1006 it is determined that an application interface is running an application that is associated with the system object, then at stage 1012 the application interface is preeminently displayed. For example, the system 100 of FIG. 1, implementing user interface software and/or hardware described in FIGS. 1, 2 and/or 3, can display one of the application interfaces 406, 408 or 410 as shown in FIG. 5B.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   at an electronic device in communication with a display and one or more input devices:
   displaying, via the display, a user interface including:
   a first user interface element,
   a second user interface element, wherein the second user interface element is at least partially obscuring the first user interface element,
   a dock displayed separately from the first user interface element and the second user interface element, wherein the dock includes a plurality of icons corresponding to respective applications, and
   an icon;
   while displaying the user interface, receiving, via the one or more input devices, an input moving the icon to a respective location within the dock; and
   in response to the input moving the icon to the respective location within the dock displaying, via the display, the first user interface element such that the first user interface element is not obscured by the second user interface element.

2. The method of claim 1, wherein:
   the first user interface element is associated with a first application program,
   the second user interface element is associated with a second application program,
   the plurality of icons includes a first icon that corresponds to a third application program, and
   the input moves the icon over a location of the first icon.

3. The method of claim 2, further comprising, in response to the input moving the icon to the respective location within the dock:
   in accordance with a determination that the third application program is not executing, launching the third application program.

4. The method of claim 2, further comprising:
   in response to the input moving the icon to the respective location within the dock, displaying, via the display, an interface of an application corresponding to the icon.

5. The method of claim 1, wherein displaying, via the display, the first user interface element such that the first user interface element is not obscured by the second user interface element comprises scaling the second user interface element such that the first user interface element is not obscured by the second user interface element.

6. The method of claim 1, wherein displaying, via the display, the first user interface element such that the first user interface element is not obscured by the second user interface element comprises:
   displaying, via the display, the first user interface element such that the first user interface element is not obscured by the second user interface element in response to the icon being within the dock for a predetermined period of time.

7. The method of claim 1, wherein the dock is disposed on an edge of the user interface.

8. The method of claim 1, wherein the dock further includes a second plurality of icons corresponding to respective system objects.

9. The method of claim 1, wherein the input moving the icon to the respective location within the dock comprises moving the icon from a location outside of the dock to a location within the dock.

10. A non-transitory computer-readable medium storing instructions, which when executed by a processor of an electronic device in communication with a display and one or more input devices, cause the processor to perform operations comprising:

displaying, via the display, a user interface including:
    a first user interface element,
    a second user interface element, wherein the second user interface element is at least partially obscuring the first user interface element,
    a dock displayed separately from the first user interface element and the second user interface element, wherein the dock includes a plurality of icons corresponding to respective applications, and
    an icon;
  while displaying the user interface, receiving, via the one or more input devices, an input moving the icon to a respective location within the dock; and
  in response to the input moving the icon to the respective location within the dock displaying, via the display, the first user interface element such that the first user interface element is not obscured by the second user interface element.

11. The non-transitory computer readable storage medium of claim 10, wherein:
  the first user interface element is associated with a first application program,
  the second user interface element is associated with a second application program,
  the plurality of icons includes a first icon that corresponds to a third application program, and
  the input moves the icon over a location of the first icon.

12. The non-transitory computer readable storage medium of claim 11, the processor of the electronic device further configured to perform operations comprising, in response to the input moving the icon to the respective location within the dock:
  in accordance with a determination that the third application program is not executing, launching the third application program.

13. The non-transitory computer readable storage medium of claim 11, the processor of the electronic device further configured to perform operations comprising:
  in response to the input moving the icon to the respective location within the dock, displaying, via the display, an interface of an application corresponding to the icon.

14. The non-transitory computer readable storage medium of claim 10, wherein displaying, via the display, the first user interface element such that the first user interface element is not obscured by the second user interface element comprises scaling the second user interface element such that the first user interface element is not obscured by the second user interface element.

15. The non-transitory computer readable storage medium of claim 10, wherein displaying, via the display, the first user interface element such that the first user interface element is not obscured by the second user interface element comprises:
  displaying, via the display, the first user interface element such that the first user interface element is not obscured by the second user interface element in response to the icon being within the dock for a predetermined period of time.

16. The non-transitory computer readable storage medium of claim 10, wherein the dock is disposed on an edge of the user interface.

17. The non-transitory computer readable storage medium of claim 10, wherein the dock further includes a second plurality of icons corresponding to respective system objects.

18. The non-transitory computer readable storage medium of claim 10, wherein the input moving the icon to the respective location within the dock comprises moving the icon from a location outside of the dock to a location within the dock.

19. A system comprising:
  a display;
  one or more input devices;
  an electronic device in communication with the display and the one or more input devices; and
  a processor of the electronic device configured to perform operations comprising:
    displaying, via the display, a user interface including:
      a first user interface element,
      a second user interface element, wherein the second user interface element is at least partially obscuring the first user interface element,
      a dock displayed separately from the first user interface element and the second user interface element, wherein the dock includes a plurality of icons corresponding to respective applications, and
      an icon;
    while displaying the user interface, receiving, via the one or more input devices, an input moving the icon to a respective location within the dock; and
    in response to the input moving the icon to the respective location within the dock displaying, via the display, the first user interface element such that the first user interface element is not obscured by the second user interface element.

20. The system of claim 19, wherein:
  the first user interface element is associated with a first application program,
  the second user interface element is associated with a second application program,
  the plurality of icons includes a first icon that corresponds to a third application program, and
  the input moves the icon over a location of the first icon.

21. The system of claim 20, the processor of the electronic device further configured to perform operations comprising, in response to the input moving the icon to the respective location within the dock:
  in accordance with a determination that the third application program is not executing, launching the third application program.

22. The system of claim 20, the processor of the electronic device further configured to perform operations comprising:
  in response to the input moving the icon to the respective location within the dock, displaying, via the display, an interface of an application corresponding to the icon.

23. The system of claim 19, wherein displaying, via the display, the first user interface element such that the first user interface element is not obscured by the second user interface element comprises scaling the second user interface element such that the first user interface element is not obscured by the second user interface element.

24. The system of claim 19, wherein displaying, via the display, the first user interface element such that the first user interface element is not obscured by the second user interface element comprises:
  displaying, via the display, the first user interface element such that the first user interface element is not obscured by the second user interface element in response to the icon being within the dock for a predetermined period of time.

25. The system of claim 19, wherein the dock is disposed on an edge of the user interface.

26. The system of claim 19, wherein the dock further includes a second plurality of icons corresponding to respective system objects.

27. The system of claim 19, wherein the input moving the icon to the respective location within the dock comprises moving the icon from a location outside of the dock to a location within the dock.

\* \* \* \* \*

UNITED STATES PATENT AND TRADEMARK OFFICE
CERTIFICATE OF CORRECTION

PATENT NO. : 11,614,845 B2
APPLICATION NO. : 15/783267
DATED : March 28, 2023
INVENTOR(S) : Hynes et al.

It is certified that error appears in the above-identified patent and that said Letters Patent is hereby corrected as shown below:

On the Title Page

Item (56) References Cited, under OTHER PUBLICATIONS, Line 2, delete "http:///www." and insert -- http://www. --.

In the Claims

In Column 8, Line 66, in Claim 10, delete "computer-readable" and insert -- computer readable --.

Signed and Sealed this
Ninth Day of May, 2023

Katherine Kelly Vidal
*Director of the United States Patent and Trademark Office*